United States Patent [19]

Cantrell et al.

[11] Patent Number: 4,690,742

[45] Date of Patent: Sep. 1, 1987

[54] METHOD AND APPARATUS FOR LASER ISOTOPE SEPARATION

[75] Inventors: C. D. Cantrell III, G. L. Peterson, both of Richardson, Tex.

[73] Assignee: Board of Regents, The University of Texas System, Austin, Tex.

[21] Appl. No.: 533,528

[22] Filed: Sep. 15, 1983

[51] Int. Cl.[4] .............................................. B01D 59/34
[52] U.S. Cl. ............................ 204/157.2; 204/157.22
[58] Field of Search ..................... 204/157.1 R, 157.22, 204/157.2

[56] References Cited

U.S. PATENT DOCUMENTS

| Re. 30,898 | 4/1982 | Cantrell et al. | 307/426 |
| 4,049,515 | 9/1977 | Robinson et al. | 204/157.1 |
| 4,256,962 | 3/1981 | Horton et al. | 250/281 |
| 4,288,691 | 9/1981 | Horton | 250/281 |
| 4,302,805 | 11/1981 | Marez et al. | 363/91 |
| 4,334,883 | 6/1982 | Robinson et al. | 23/293 |

OTHER PUBLICATIONS

Peterson et al. "Adiabatic Excitation of Multilevel Band Systems", Optics Communications, vol. 43, No. 2, pp. 123-127, Sep. 1982.
Cantrell et al. "Two-Photon Excitation of $SF_6$" Chemical Physics Letters, vol. 93, No. 2, pp. 267-272, Dec. 1982.
Steel et al. "Two-Photon Coherent-Transient Measurement of the Nonradiative Collisionless Dephasing Rate of $SF_6$ Via Doppler-Free Degenerate Four-Wave Mixing", Physical Review Letters, vol. 43, No. 21, pp. 1588-1591, Nov. 1982.
Flushberg et al. "Probing Adiabatic States", Physical Review A, vol. 14, No. 2, pp. 813-815, Aug. 1976.
Grischkowsky "Gocherent Excitation, Incoherent Excitation and Adiabatic States", Physical Review A, vol. 14, No. 2, pp. 802-812, Aug. 1976.
Grischkowsky et al. "Adiabatic Following Model for Two-Photon Transitions: Nonlinear Mixing and Pulse Propagation", Physical Review A, vol. 12, No. 6, pp. 2514-2533, Dec. 1975.
Grischkowsky et al. "Self-Induced Adiabatic Rapid Passage", Physical Review, A, vol. 12, No. 3, pp. 1117-1120, Sep. 1975.

Primary Examiner—John F. Terapane
Assistant Examiner—Virginia B. Caress
Attorney, Agent, or Firm—Arnold, White & Durkee

[57] ABSTRACT

A method and apparatus for laser isotope separation of atoms or molecules. The method for laser isotope separation comprises the irradiation of an atom or molecule to produce an adiabatic population inversion, terminating the radiation sufficiently abruptly to trap the atom or molecule in an excited state, and further radiating the atom or molecule for causing transitions out of the previously excited state for dissociating the molecule or for causing a chemical reaction to effect isotopic separation. The method comprises slowly increasing the intensity of the initial radiation from zero to a value sufficiently high to produce an adiabatic population inversion when the frequency is tuned near a single narrow resonance which includes the overlapping multiphoton resonances originating from either the rotational energy levels of the vibrational ground state of the molecule or the different hyperfine levels of the ground state of the atom for providing the adiabatic population inversion. The apparatus for laser isotope separation comprising a first irradiation means that provides a slowly increasing continuum of intensity from zero to a sufficiently high value to produce an adiabatic population inversion when the frequency is tuned near a single narrow resonance associated with the atom or molecule, a second irradiation that produces radiation having an appropriate wave length, an intensity sufficient to cause transitions out of the previously excited state and a smooth, shorter pulse shape than required for the first irradiation means, and a Raman shifting cell, utilized with the first and second irradiation means for shifting the wave length of the radiation as needed.

31 Claims, 4 Drawing Figures

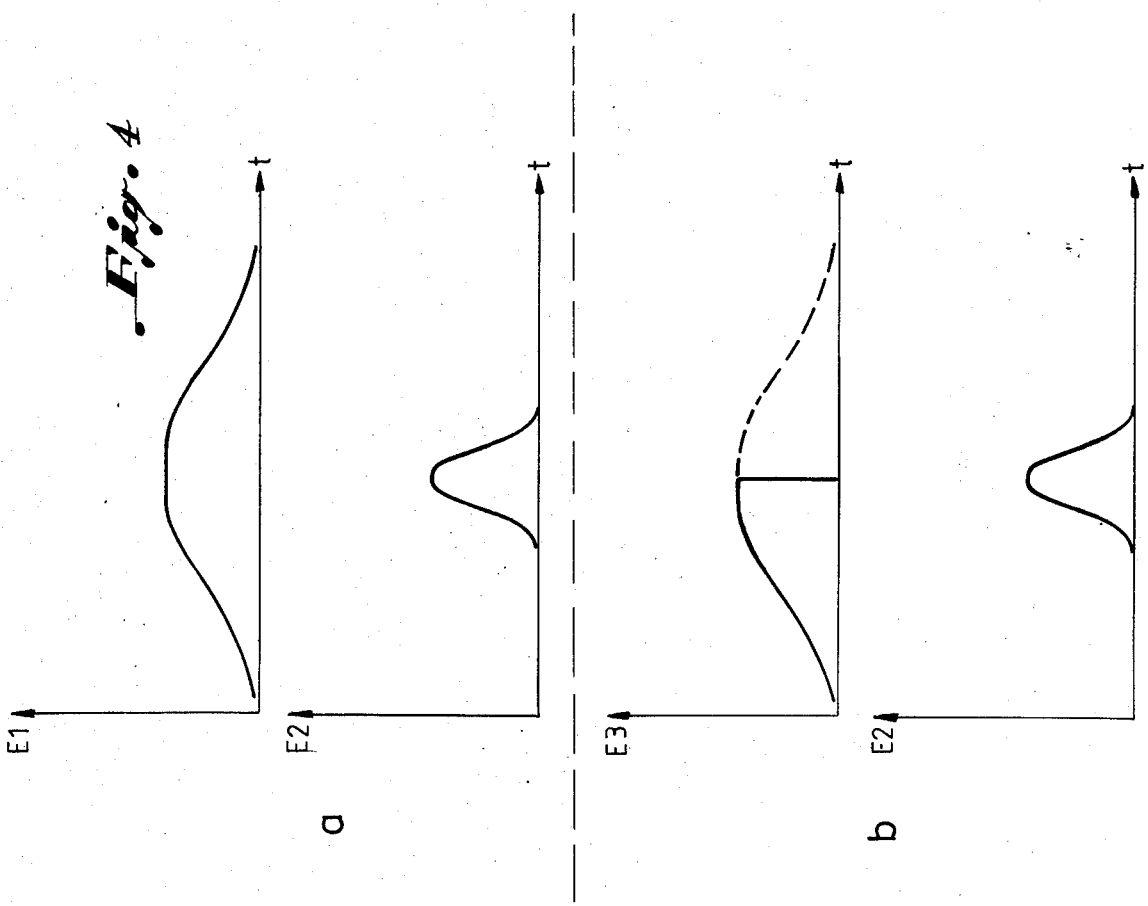
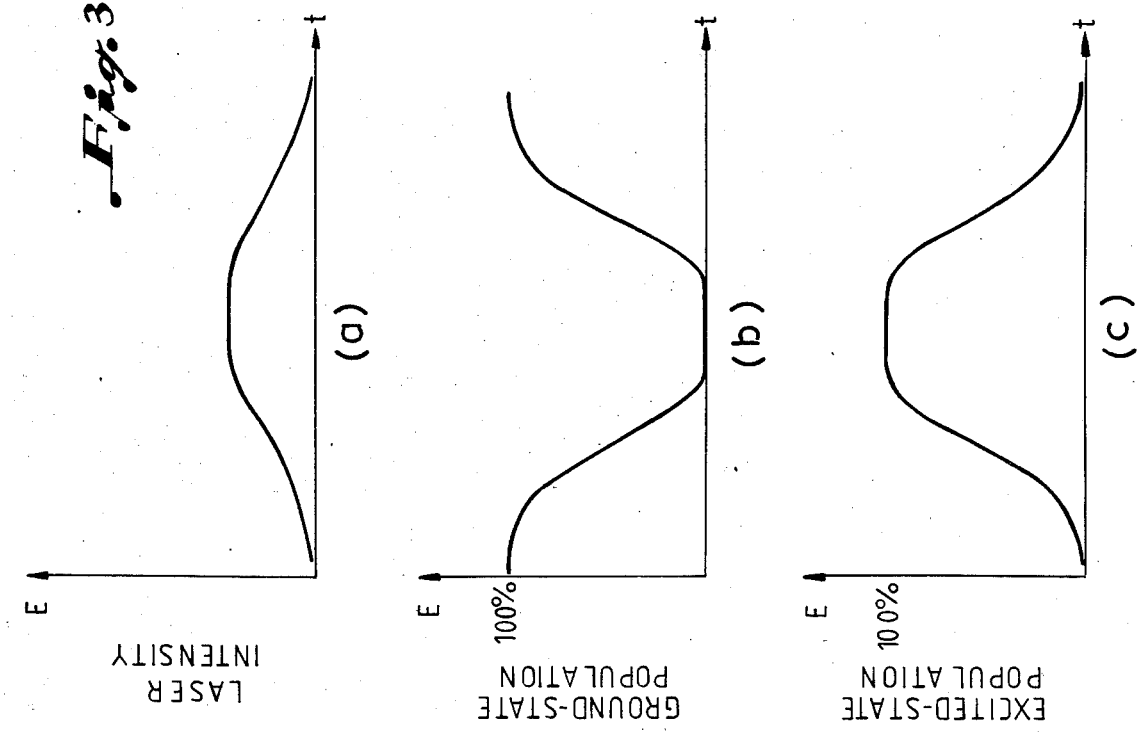

METHOD AND APPARATUS FOR LASER ISOTOPE SEPARATION

BACKGROUND OF THE INVENTION

The present invention relates generally to the separation of stable or radioactive isotopes. Specifically, the present invention relates to a method and apparatus for the selective excitation of atoms or of polyatomic molecules for laser isotope separation using adiabatic population inversion on narrow multi-photon resonances.

The use of material enriched in one or more specific isotopes has become increasingly important. Many aspects of medicine, nuclear energy production and other areas of high-technology have significantly increased the demand for large quantities of materials enriched in certain isotopes at a relatively low cost. Specifically, the separation of isotopic species of heavier or high atomic weight elements is considerably more difficult than the separation of isotopic species of lower atomic weight elements. Thus, the complexity and cost aspects of the isotope separation of high atomic weight elements is a major problem.

It is well known to separate the isotopes of high atomic weight elements by use of gaseous diffusion. Gaseous diffusion has been one of the most widely used methods of isotope separation for heavy elements. The isotopes of elements differ by virtue of their mass, and not appreciably because of their chemical properties. Therefore, gaseous diffusion separation employs processes in which force produce different responses for the isotopes on the basis of mass.

The most rudimentary type of gaseous diffusion separator consists of a container with a porous membrane separating the container into two halves. A gas containing the material to be separated is supplied on one side of the porous membrane at a slight pressure, and a lower pressure or vacuum is maintained on the other side of the membrane. The molecules associated with each isotope have different masses. The average energies of the molecules, regardless of mass, are approximately the same. However, the velocity of the lighter molecules is higher than that of the heavier molecules. Thus, the frequency of collison against the porous membrane will be higher for the lighter molecules than the heavier molecules. Consequently, a slightly higher proportion of the lighter molecules will pass through the porous membrane. After a period of time has elapsed, the material on the low pressure side of the porous membrane will have a different ratio of numbers of the respective isotopes than the original mixture had. It can be appreciated that the separation of isotopes by gaseous diffusion is a massive and expensive undertaking.

More recently, the separation of isotopes has encompassed a broad range of technology. Additional methods of separating isotopes include electromagnetic separation, centrifugal separation and separation by selective excitation.

The development of laser systems, tunable to very narrow frequencies over a wide range of the spectrum, have significantly enhanced the utilization of laser technology in the field of isotope separation. Using tunable laser systems, the spectral response of the interaction of light with matter allows the production of selected reactions than can change the composition and properties of the matter.

The selective excitation of a specific isotope by a beam of laser light is a most promising technique for initiating isotope separation. Specifically, an infrared laser beam has been used for isotope separation by multiphoton excitation and dissociation of polyatomic molecules, and a visible excitation beam has been used for isotope separation by sequential (step-wise) excitation and dissociation of atoms. The excitation beams of the prior art have been precisely tuned to a particular wavelength and have a line-width sufficiently narrow so as not to excite other isotopes at nearby ground state wavelengths. The excitation beam uses a specific frequency and sufficient power to cause the molecule or atom containing the desired isotope to be excited to a specific energy state or to an average energy that is substantially higher than the average energy of the molecules or atoms containing the non-selected isotope or isotopes.

Once selective excitation has been made to occur, numerous processes contribute to de-exciting the isotopic species. An important loss mechanism is the collisional energy transfer between molecules. Thus, it is highly desirable that the selectively excited species be transformed to a stable or metastable state. The selectivity of the process for the desired species can be maintained through photoionization or photodissociation of the excited species. However, the processes of photoionization or photodissociation may not be selective.

Isotope separation using laser technology provides the capability of producing relatively large quantities of materials enriched in one or more isotopes at a relatively low cost. Typically, in molecular laser isotope separation the raw material to be enriched is in a gas phase. The gas phase is adiabatically expanded through a nozzle to a reduced temperature and high flow rate. The gas is rapidly cooled. It has been found that rapid cooling can be initiated by a nozzle which provides a means of reducing the population of excited vibrational states and thereby suppressing spectral interference due to transitions that originate from excited states. The cooled gas is irradiated by an infrared laser to selectively excite a specific vibrational state of an isotopic molecule in the gas mixture. The gas, which now includes the excited isotopic molecular species, is again irradiated. The second irradiation increases the energy of the excited isotope to a level where it may photodecompose, photo-ionize or photo-dissociate in a manner allowing separation from molecules containing other isotopes.

In atomic vapor laser isotope separation, a vapor of the chemical element the isotopes of which are to be separated is irradiated with one or more laser beams tuned to the frequencies of transitions between specific atomic states, and from one or more discrete atomic states to the ionization continuum or to resonances lying above the ionization threshold. The ions of the isotopic atoms are then subjected to an electric field in order to drive said atoms to impact on a collector plate which forms or is adjacent to the anode of the system that produces the electric field.

The rationale behind the above discussed processes is to utilize accurately tuned energy in the infrared or visible regions of the spectrum. The tuned energy will selectively excite only one of the isotopic species. The tuned energy is inadequate to excite the isotopic compound or atom which is absorbing the energy sufficiently to produce dissociation or ionization. The final excitation provides sufficient energy to produce ionization or dissociation. However, the line-widths associated with the second excitation are larger than at lower powers or intensities which greatly increases the difficulty of achieving selective absorption. Thus, photodissociation or photoionization is readily produced but it is not likely to be selective. Therefore, one isotopic species is selectively excited by the infrared laser, then an additional amount of energy is provided which is absorbed by both species. The second excitation drives the excited isotopic compound past the dissociation or ionization threshold. Whereas, the isotopic compound or atom that remained in the ground state during the initial infrared or visible irradiation is not sufficiently excited by the second irradiation pulse to be dissociated or ionized even though it also absorbs laser energy from the second excitation beam.

Numerous problems have been associated with the separation of isotopes of heavy elements. In general, it is more difficult to separate isotopes of heavy elements than isotopes of light elements. The isotope shifts of infrared or optical absorption lines are much smaller for atoms or compounds of heavy elements. A very large number of vibration-rotation states closely spaced in frequency are typically associated with gaseous polyatomic compounds of heavy elements. Selective light absorption is further complicated for heavy elements because at temperatures at which their compounds are gaseous, a large number of vibration-rotation states are already excited. The prior art in laser isotope separation utilizes selective excitation of one-photon resonances, for which the spectral complexity due to thermal excitation of a large number of vibration-rotation states may result in overlap of the single-photon resonances of the isotopic species which it is desired to separate. The overlap of the single-photon resonances of the various isotopic species also may increase at higher laser intensities of power densities, making efficient isotopic separation impossible to achieve.

There is, thus, a need for a laser isotope separation method and apparatus which provides isotope separation that is not restricted to the selective excitation from a ground state to a first excited state, which, at the same time, provides easy use for a broad range of polyatomic molecules, which is readily utilized with similar prior available systems, and which provides exceedingly efficient selection of the excited species.

Recognizing the need for an improved method and apparatus for laser isotope separation, it is, therefore, a general object of the present invention to provide a novel laser isotope separation method and apparatus which minimizes or reduces the problems associated with the presently known technology.

It is therefore a feature of the present invention to provide a laser isotope separation method and apparatus for efficiently selecting the specific species to be excited.

It is a more particular feature of the present invention to provide a laser isotope separation method and apparatus using adiabatic population inversion on narrow multiphoton resonances in polyatomic molecules.

It is another feature of the present invention to provide a laser isotope separation method and apparatus using adiabatic population inversion on multiphoton resonances in atoms.

Another feature of the present invention is to provide a laser isotope separation method and apparatus that can raise the majority of molecules or atoms of a preselected species to an excited state.

Yet another feature of the present invention is to provide a laser isotope separation method and apparatus using infrared, visible or ultraviolet laser radiation with a wavelength, an intensity and a pulse shape that have been chosen to produce an adiabatic population inversion.

Yet another feature of the present invention is to provide a laser isotope separation method and apparatus that initiates population inversion by the excitation of a narrow multiphoton spectral line composed of overlapping multiphoton resonanced originating from the rotational energy levels of the vibrational ground state of a polyatomic molecule or of overlapping multiphoton resonances originating from different hyperfine levels of the ground state of an atom.

Yet still another feature of the present invention is to provide a laser isotope separation method and apparatus that utilizes a population inversion and the narrow, overlapping multiphoton resonances which permit the excitation of nearly all of a preselected species.

Still another feature of the present invention is to provide a laser isotope separation method and apparatus that permits much higher selectivity and more efficient utilization of the isotopic atoms or polyatomic molecules to be separated.

Yet still another feature of the present invention is to provide a laser isotope separation method and apparatus that reduces or eliminates the requirement for extreme spectral simplification through the excitation of narrow multiphoton resonances rather than single-photon resonances.

Additional objects and advantages of the invention will be set forth in part in the description which follows, and in part will become apparent from the description, or may be learned by practice of the invention. The objects, features and advantages of the invention may be realized by means of the combinations and steps particularly pointed out in the appended claims.

SUMMARY OF THE INVENTION

To achieve the foregoing objects, features and advantages, and in accordance with the purposes of the invention as embodied and broadly described herein, a laser isotope separation method is provided for the efficient selective excitation of atoms or polyatomic molecules. The method of the present invention for the laser isotope separation of atoms or polyatomic molecules comprises a series of steps. First, the polyatomic molecules are irradiated by a laser at an infrared frequency or the atoms are irradiated by a laser at a visible frequency. The laser intensity may be slowly increased from zero to a maximum value greater than the intensity at which adiabatic population inversion occurs for the desired species, but less than the intensity for which adiabatic inversion occurs for the non-desired species. The laser beam used to irradiate the atoms or polyatomic molecules has an appropriate wavelength, sufficient intensity and a specific pulse shape. The slowly increasing intensity of the laser beam creates an adiabatic population inversion between the ground state and an excited state of the atom or polyatomic molecule containing the desired isotope. Second, the polyatomic molecule is again irradiated at an infrared frequency having an appropriate wavelength, an intensity sufficient to cause transitions out of the previously excited state, and a pulse duration shorter than required to cause unwanted adiabatic population inversion. In the case of laser isotope separation of polyatomic molecules, the additional irradiation causes the polyatomic molecule to dissociate and thereafter react with reagents or causes a chemical reaction for the isotopic separation of the polyatomic molecule. It is additionally preferable that the single narrow resonances include the overlapping, multiphoton resonances from the majority of the ground state rotational energy levels of the polyatomic molecules.

In the case of laser isotope separation of atoms, the additional irradiation causes the atom to ionize. The ions produced in this way are then collected on an electrically charged plate. It is required that the narrow atomic multiphoton resonances include as many as possible of the overlapping multiphoton resonances originating from the hyperfine levels of the atomic ground state.

Additionally, applicant's invention comprises a method for the laser isotope separation of polyatomic molecules comprising the steps of irradiating a polyatomic molecule in a slowly increasing laser field, abruptly terminating the irradiation to trap the polyatomic molecule in an excited state, as is explained in greater detail below, and additionally irradiating the molecule at an intensity sufficient to cause transitions out of the previously excited state.

Additionally, applicant's invention provides a method for the laser isotope separation of atoms having the step of irradiating an atom in a slowly increasing laser field, abruptly terminating the radiation to trap the atom in an excited state as is explained in greater detail below, and additionally irradiating the atom by a laser at an intensity sufficient to cause transitions out of the previously excited state.

Preferably, in the case of molecular laser isotope separation the irradiating laser beam has an appropriate wavelength, intensity and pulse shape to coincide with and excite efficiently a single narrow resonance associated with the polyatomic molecule including the overlapping, multi-photon resonances from the majority of ground state rotational energy levels. The second irradiating beam has an appropriate wavelength, an intensity sufficient to cause transitions out of the previously excited state, and a specific phase shape. The combination of the appropriate wavelength, intensity, and pulse shape are sufficient to dissociate the excited polyatomic molecule or to cause a chemical reaction for the eventual isotopic separation of the molecules.

Additionally, the rise time and the fall time of the laser pulse must conform to certain specifications. The requisite rise time and fall time of the laser pulse is determined by the energy levels and transition moments of th atom or molecule and by the laser frequency.

Of independent significance, applicant's invention comprises a laser isotope separation apparatus for the efficient and selective excitation of atom or polyatomic molecules using adiabatic population inversion. The laser isotope separation apparatus of the present invention utilizes a first molecular gas laser oscillator to produce a laser beam at a basic wavelength, a first molecular gas laser amplifier to amplify the laser beam to the intensity necessary for creating an adiabatic population inversion, a second molecular gas laser oscillator and associated amplifier to produce a laser beam at an infrared frequency having an appropriate wavelength, an intensity sufficient to cause transitions out of the previously excited state, and a smooth, shorter pulse shape than the pulse required to cause the population inversion, and a Raman shifting cell, utilized with the first and second oscillator and amplifier combination for shifting the wavelength of the laser beams as needed.

BRIEF DESCRIPTION OF THE DRAWINGS

The accompanyingg drawings, which are incorporated into and constitute a part of the specification, illustrate a preferred embodiment of the embodiment of the invention and, together with the general description of the invention given above, and the detailed description of the preferred embodiment give below, serve to explain the principles of the invention.

FIG. 3 illustrates the principal of adiabatic population inversion utilized in the present invention;

FIG. 4 illustrates two approaches which may be utilized to practice the present invention.

The above general description and the following detailed description are merely illustrative of the generic invention, and additional modes, advantages, and particulars of this invention will be readily suggested to those skilled in the art by the following detailed description.

DESCRIPTION OF THE PREFERRED EMBODIMENTS

Reference will now be made in detail to a presently preferred embodiment of the invention as illustrated in the accompanying drawings.

Polyatomic molecules exhibit several vibrational absorption bands in the infrared spectra in either fundamental or combination modes. Typically, when the polyatomic molecules are sufficiently cooled by adiabatic expansion through a nozzle, the resultant narrowing of the infrared single-photon absorption features permits the absorption lines due to molecules containing each of the naturally occurring isotopes to be resolved. Such ground vibrational states have been found that have high infrared absorption at specific wavelengths. These wavelengths correspond with the combination and fundamental modes of the molecular vibrations.

A high power infrared laser beam at a wavelength corresponding to the isotope vibrational state having a line-width narrow enough to only excite a selected isotope can be used. The selected isotope may be excited by infrared absorption and may then be further excited to an energy at which dissociation or chemical reaction occurs, so that the selected isotope may be separated from the polyatomic molecule stream. The separated isotope may then be collected in a highly purified state, or the gas, which is now depleted in this isotope and thus enriched in another isotope, may be collected for further enrichment by additional separations, as desired. Specifically, selective excitation refers to the tuning of the laser light frequency to effect absorption by an optical absorption state of only one isotope.

Very sharp spectral features are required to effectively practice the present invention. It has been found to be highly preferable that the isotopic mixture which is to undergo separation be in the gaseous state when it is irradiated with the tuned laser light. Gaseous mixtures permit the efficient interaction of the laser light with the desired isotopic species. Additionally, gaseous mixtures limit the possibility that selectively excited molecules will transfer their excitation to non-excited species.

Figure 1:
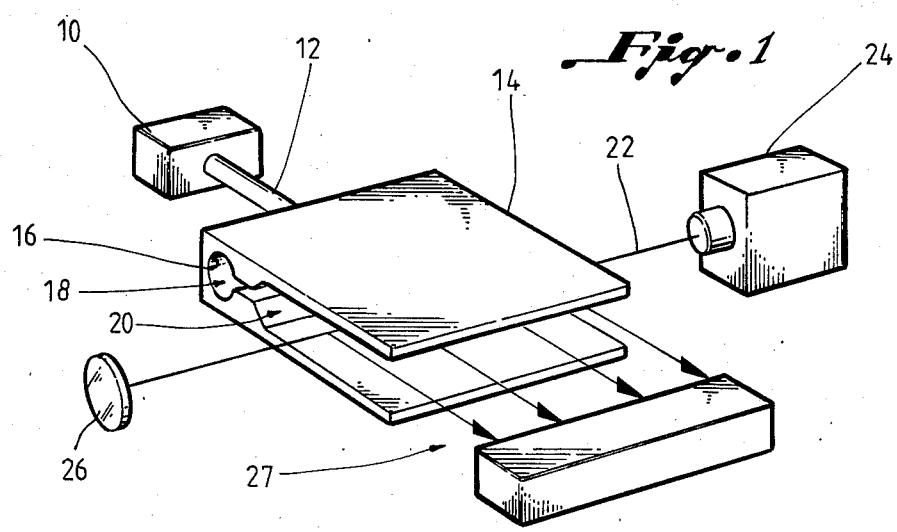
FIG. 1 is a perspective, diagrammatic view of an isotope separation system utilizing the present invention.

FIG. 1 shows a perspective view of the isotope separation system which utilizes the concepts of the present invention. The abiabatic expansion of the gas, which includes a mixture of the isotopes to be separated or enriched, may be readily accomplished by means of contoured supersonic nozzles of the type well known in the gas dynamic laser art. Such a nozzle, Laval nozzle 14 is illustrated in FIG. 1. A gaseous compound containing a mixture of isotopes may be contained in gas source 10. The gas flows from source 10 through the conduit 12 to the Laval nozzle 14. The isotope containing gas may be fed into the chamber 16 in the nozzle 14 under high pressure, typically, one thousand to two thousand torr. The gas then flows through a constriction 18 to an expansion chamber 20 thereby providing an adiabatic expansion of the gas in the expansion chamber 20. The gas may be accelerated from the chamber 16 to the expansion chamber 20 at a speed of from about Mach 4 to Mach 5. Typically, gases thus treated may be cooled to a temperature such that 90% or more of the molecules are in the ground vibrational state.

The laser beam 22 of infrared radiation may be directed through the cooled gas in the expansion chamber 20 by a laser system 24 and the appropriate optics 26. The infrared laser beam 22 can be tuned to a wavelength associated with a single narrow resonance which includes the overlapping multiphoton resonances from the majority of ground state rotational energy levels of the gas. The infrared laser beam 22 should have a desired wavelength, a specific pulse shape and sufficient intensity for producing an adiabatic population inversion between the ground state and a preselected excited state. To initiate the adiabatic population inversion, the laser system 24 slowly increases the intensity of the infrared laser beam 22 from a value of zero to a value sufficient to produce adiabatic inversion.

An additional beam of infrared radiation (not shown) may be directed along the same path as the beam 22 from the laser system 24, or along a separate path of a separate laser system, as needed. The second laser beam interacts with the gas stream 27 in the expansion chamber 20 to further excite the excited isotope atoms to a level where dissociation or chemical reaction occurs, so that isotopic separation from the gas stream may be achieved.

Figure 2:
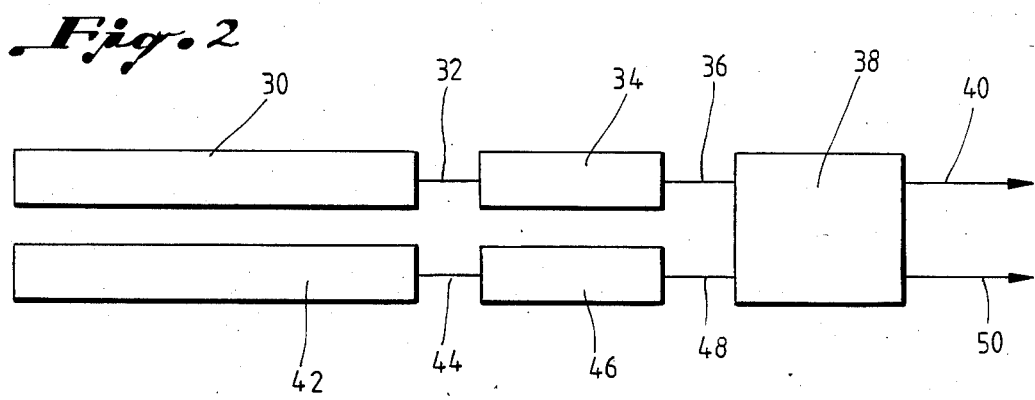
FIG. 2 is a block diagram showing the major components of the laser system of the present invention.

A representative laser system which may be utilized for the laser system 24 to produce the infrared laser beam 22 is illustrated in FIG. 2. The system may include a first molecular gas laser oscillator 30 which produces a laser beam 32 at a first infrared wavelength. The beam 32 may then be directed through a first molecular gas laser amplifier 34 which amplifies the laser beam at the first wavelength to a high power beam 36. The high power beam 36 may be directed through a Raman shifting cell which produces an output infrared laser beam 40 having the desired wavelength, line-width and energy or intensity. Also, a second molecular gas laser oscillator 42 can be used to produce a second laser beam 44 at a second infrared wavelength. The second beam 44 may then be directed through a second molecular gas laser amplifier 46 which amplifies the laser beam at the second wavelength to a high power beam 48. The high power beam 48 at the second wavelength may be directed through the Raman shifting cell 38 to produce a desired infrared laser beam 50 having the appropriate wavelength, line-width and energy or intensity.

The molecular gas laser oscillators 30 and 42 may be any suitable laser oscillator arrangement which is capable of producing an infrared laser beam at the desired wavelengths. The oscillators 30 and 42 may utilize a leasing medium including such gases as carbon monoxide (CO), carbon dioxide ($CO_2$) and carbonyl sulfide (OCS) which may be appropriately excited or pumped to lase at the required wavelengths.

The molecular gas laser amplifiers 34 and 46, like the oscillators 30 and 42, may be any diatomic or polyatomic molecular gas laser which can be excited to produce a stimulated laser beam by suitable external excitation. The amplified laser beams 36 and 38 may be adjusted to a new and longer wavelength than laser beams 32 and 44, respectively.

If the laser beams 36 and 48 are not precisely at, or very close to, the desired wavelengths, the beams 36 and 48 may be directed through an appropriate Raman shifting cell 38 as shown in FIG. 2. The Raman shifting cell 38 will shift the wavelength of the laser beams 36 and 48 to a third desired wavelength as beams 40 and 50, respectively. The last beams 40 and 50 having the desired wavelengths, may be directed through the isotope mixture in the Laval nozzle 14.

The pressure of the gases in the Raman shifting cell 38 is critical. The pressure should be selected so as not to unduly broaden the line-width of the laser beams 40 and 50. Typical gas pressures may vary from about 10 to about 100 atmospheres and may be maintained at temperatures from about the boiling point of the liquefied gases to 300° K.

It is important that the infrared laser beams 40 and 50 have an appropriate wavelength, intensity and pulse shape. These characteristics are required to coincide with the single narrow resonance associated with the overlapping, multiphoton resonances from the majority of ground-state rotational energy levels of the polyatomic molecules.

FIG. 3 illustrates the principal of population inversion utilized in the present invention. FIG. 3(a) shows the intensity of the laser beam 40 during a cycle from noninverted, to inverted, and back to noninverted. The intensity is zero at time equals zero. As the oscillator 30 gradually increases the output of the beam 32, the intensity of the beam 40 also gradually increases. The intensity increases to a magnitude associated with the energy required to cause an adiabatic population inversion. Thereafter, the intensity may be stabilized and then gradually decreased. At some later time, the intensity again decreases to zero. FIGS. 3(b) and 3(c) illustrate the population exchange between the ground state, as shown in FIG. 3(b) and some excited state as shown in FIG. 3(c). As the intensity of the laser beam 40 increases, the population of the ground state decreases. The population of the ground state decreases from 100% to about 0% as the frequency of the beam 40 is correctly tuned. Simultaneously, the population of the associated excited state, initially essentially unpopulated, increases. As the intensity of the beam is decreased, the ground state population increases and the excited state population decreases. The excited state population returns to 0% as the population of the ground state approaches 100% as the respective states return to their original configurations.

Therefore, to practice the present invention, it is required to cause a reaction with the selected molecules that have been excited. Two methods are proposed for locking the system in an excited state to initiate the further separation of the isotopes. A first approach is to use two laser beams: one to adiabatically invert the population, as previously discussed, and another to excite further. A second approach is to use an inverting pulse that is abruptly truncated, trapping the system in the excited state and thereafter further exciting with another pulse.

The two pulse approach utilizes a first pulse to initate the population inversion and a second pulse to excite the molecules that have experienced the population inversion further. The two pulse approach utilized in the present invention is illustrated in FIG. 4. In FIG. 4(a), two independent intensity or laser electric field amplitude scales E1 and E2 are associated with the same time scales represented by t. The graphs illustrate the laser intensity or laser electric field strength versus the time of application to illustrate the time dependence of the system. E1 corresponds to the first laser frequency which is used to produce the adiabatic population inversion. The pulse used to produce the inversion is a long gradually increasing pulse which effectuates the adiabatic population inversion of the present invention. Then, at a second frequency, a shorter pulse may be initiated. The shorter pulse shown in FIG. 4(a) is pulses at the maximum value of the first pulse, i.e., the value at which the first pulse effects population inversion. Thus, the first frequency, E1 has gradually created an adiabatic population inversion, and the second pulse E2 causes transitions out of the excited states populated by the first pulse. The two pulse approach requires that there exist a precise timing coincidence between the two pulses. The timing coincidence is required to provide that the second pulse is efficiently used only when the system is fully inverted or fully excited.

The second approach, uses a truncated pulse and therefore provides more flexibility in practicing the present invention. The truncated pulse approach uses a first laser tuned to a specific frequency the intensity of which slowly increases to create an adiabatic population inversion in the desired polyatomic molecules. When the population inversion has been fully initiated, the pulse is abruptly truncated. The system is then trapped in the excited state. Several techniques are available for making the abrupt cutoff of the laser beam. One such method is to focus the laser beam through a plasma breakdown cell. The plasma breakdown cell contains a clean gas such as dry nitrogen. At a critical value of the laser field strength, sufficient electrons will be produced in the time the laser is on to cause the plasma to break down at the focus. Once the plasma is formed, the plasma absorbs all the laser energy in the infrared spectra. Therefore, in a few picoseconds, the plasma breakdown cell can absorb completely all of the relevant energy to essentially shutoff the laser beam. Use of the plasma breakdown cell requires precise control over the shape and purity of the laser pulse. Any spikes on the pulse may cause a breakdown at a premature level of input energy. An alternate technique for abruptly truncating the inverting pulse is to use an electro-optic switch. Numerous materials are available which provide effective means of electro-optically switching an apparatus similar to the present invention.

The rise time $t_R$, and fall time, $t_F$, of the laser pulse must conform to certain specifications which have not been correctly taught by the prior art pertaining to laser isotope separation. Specifically, the rise time $t_R$ of the laser pulse must be much greater than a certain time, $t_M$, that is determined by the energy levels, energy eigenfunctions and transition moments of the atom or molecule and by the laser frequency. In addition, the fall time, $t_F$, must be much less than $t_M$. The time is defined to be $$t_M = \max_{E_o \leq E_{max}} \left\{ \max_c \frac{|<\lambda_o(E_o)|\Delta|\lambda_c(E_o)>|}{[w_{oc}(E_o)]^2} \right\}$$

where $|\lambda_o(E_o)>$ is the dressed state that evolves continuously from the ground state of the atom or molecule as the amplitude of the laser electric field is increased adiabatically from zero to $E_o$; $|\lambda_c(E_o)>$ is the dressed state that evolves continuously from an excited state; $hw_{oc}$ is the difference of energy between $|\lambda_o(E_o)>$ and $|\lambda_c(E_o)>$ at the laser electric field amplitude $E_o$; $\Delta$ is a diagonal matrix, the diagonal elements of which in the basis of atomic or molecular energy eigenstates in zero laser field are $$\Delta_{mm} = N(m)w - E_m/\hbar$$

where $$N(m) = \text{integer part} \left\{ \frac{E_m}{\hbar w} \right\}$$

w being the laser frequency and $E_m$ being the energy of the atomic or molecular eigenstate in zero laser field; and $E_{max}$ is the laser electric field amplitude at the instant when the laser pulse achieves its maximum intensity. The time $t_M$ given above can be determined using the transition moments and energy levels of atoms and polyatomic molecules of practical interest. Thus, for atoms and polyatomic molecules of practical interest, the laser frequency w may be tuned to make $t_R$ of an order of magnitude such that a pulse rise-time $t_R$ much longer than $t_M$ and a pulse fall time $t_F$ much shorter than $t_M$ can both be achieved with present-day laser technology.

The present invention reduces or eliminates the requirement for extreme spectral simplifiction through the excitation or narrow multiphoton resonances rather than single-photon resonances. The present invention may, however, be applied to yield adiabatic inversion of the population of a (1,N) system, in which single-photon transitions are possible from the ground state to each of several excited states, no single-photon transitions being possible from one excited state to another.

Figure 5:
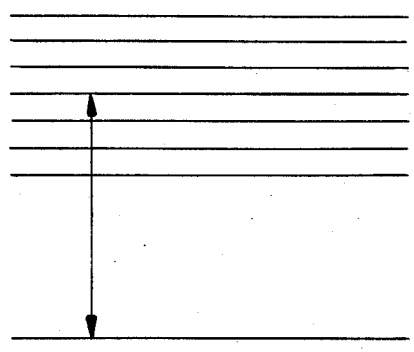
FIG. 5 is an energy diagram of the excitation of a (1,N) system.

Total depopulation of the ground state may be possible in practicing the present invention. To acquire a total depopulation of the ground state the states of the atom or the polyatomic molecule must be carefully considered. Also the state which is desired to be populated must be preselected. An example of a preselected population inversion for a (1,N) system is shown in FIG. 5. The appropriate laser wavelength, intensity and pulse shape may be determined to coincide with the excited energy state to be populated.

Additional advantages and modifications will readily occur to those skilled in the art. The invention in its broader aspects is therefore not limited to the specific details, representative apparatus, and the illustrative examples shown and described herein. Accordingly, departures may be made from the detail without departing from the spirit or scope of the disclosed general inventive concept.

What is claimed is:

1. A method of separating a selected isotope from a sample material comprising the steps of:

first, irradiating the sample with laser means for producing an adiabatic population inversion of said selected isotope at an excited state, the pulse shape of the first irradiation having a particular rise time greater than $t_m$, where $t_m$ equals:

$$t_M = \max_{E_o \leq E_{max}} \left\{ \max_c \frac{|<\lambda_o(E_o)|\Delta|\lambda_c(E_o)>|}{[w_{oc}(E_o)]^2} \right\}$$

where $|\lambda_o(E_o)>$ is the dressed state that evolves continuously from the ground state of the atom or molecule as the amplitude of the irradiation field is increased adiabatically from zero to $E_o$, $|\lambda_c(E_o)>$ is the dressed state that evolves continuously from an excited state, $\hbar w_{oc}(E_o)$ is the difference of energy between $|\lambda_o(E_o)>$ and $|\lambda_c(E_o)>$ at the irradiating field amplitude $E_o$, $\Delta$ is a diagonal matrix, the diagonal elements of which in the basis of atomic or moleculr energy eigenstates in zero radiation field are $\Delta_{mm} = N(m)w - E_m/\hbar$ where $N(m) = \text{integer part} \left( \frac{E_m}{\hbar w} \right)$ w being the radiation frequenty and $E_m$ being the energy of the atomic or molecular eigenstate in zero radiation field, and $E_{max}$ is the radiation field amplitude at the instant when the pulse achieves its maximum intensity; and second, irradiating the isotope while in said excited state with laser means to cause a transition of said selected isotope from said excited state.

2. The method as defined in claim 1 further comprising increasing the intensity of the laser irradiating the sample from zero to a sufficiently high value to produce the adiabatic population inversion.

3. The method as defined in claim 1 wherein the intensity of the laser means irradiating the sample is increased from zero to a sufficiently high value to produce the adiabatic population inversion when the frequency is tuned near a single narrow resonance associated with the atom or molecule.

4. The method as defined in claim 1, the isotope comprising an atom or molecule, further comprising increasing the intensity of the laser means irradiating the sample from zero to a sufficiently high value to produce the adiabatic population inversion when the frequency is tuned near a single narrow resonance associated with the atom or molecule, the single narrow resonance including overlapping multiphoton resonances originating from either the rotational energy levels of the vibrational ground state of the molecule, or different hyperfine levels of the ground state of the atom.

5. The method as defined in claim 1 wherein the second irradiation of the isotope while in the excited state has a wavelength and intensity sufficient to cause transitions out of the excited state and a pulse shape shorter than required to cause the adiabatic population inversion.

6. The method as defined in claim 1 wherein at least one of the irradiating steps is provided by infrared laser means.

7. The method as defined in claim 1 wherein at least one of the irradiating steps is provided by ultraviolet laser means.

8. The method as defined in claim 1 wherein the selected isotope comprises an atom or polyatomic molecule.

9. A method for selective isotope separation comprising:

(a) first, irradiating a sample material containing an isotope in atomic or molecular form, to selectively excite said isotope, the intensity of the radiation slowly increasing from zero to a sufficiently high value to produce an adiabatic population inversion of said isotope when the frequency is tuned near a single narrow resonance associated with the isotope and the radiation having a pulse shape for providing the adiabatic population inversion of said isotope between the ground-state and an excited state, the pulse shape of the first irradiation having a particular rise time greater than $t_m$, where $t_m$ equals:

$$t_M = \max_{E_o \leq E_{max}} \left\{ \max_c \frac{|<\lambda_o(E_o)|\Delta|\lambda_c(E_o)>|}{[w_{oc}(E_o)]^2} \right\}$$

where $|\lambda_o(E_o)>$ is the dressed state that evolves continuously from the ground state of the atom or molecule as the amplitude of the irradiation field is increased adiabatically from zero to $E_o$, $|\lambda_c(E_o)>$ is the dressed state that evolves continuously from an excited state, $\hbar w_{oc}(E_o)$ is the difference of energy between $|\lambda_o(E_o)\rangle$ and $|\lambda_c(E_o)\rangle$ at the irradiating field amplitude $E_o$, $\Delta$ is a diagonal matrix, the diagonal elements of which in the basis of atomic or molecular energy eigenstates in zero radiation field are $\Delta_{mm} = N(m)w - E_m h$ where $$N(m) = \text{integer part}\left\{\frac{E_m}{\hbar w}\right\}$$

w being the radiation frequency and $E_m$ being the energy of the atomic or molecular eigenstate in zero radiation field, and $E_{max}$ is the radiation field amplitude at the instant when the pulse achieves its maximum intensity; and (b) second, irradiating the isotope in the excited state at a frequency having a wavelength, intensity, and pulse duration sufficient to cause transitions out of the excited state to effect nonadiabatic isotopic separation.

10. The method as defined in claim 9 wherein the isotope comprises an atom or polyatomic molecule.

11. The method as defined in claim 9 wherein each irradiation is provided by laser means.

12. The method as defined in claim 9 wherein at least one irradiation is provided by infrared laser means.

13. The method as defined in claim 9 wherein at least one irradiation is provided by ultraviolet laser means.

14. The method as defined in claim 10 wherein the single narrow resonance associated with the molecule includes the overlapping multiphoton resonances originating from the rotational energy levels of the vibrational ground state of the molecule.

15. The method as defined in claim 10 wherein the single narrow resonance associated with the atom includes the overlapping multiphoton resonances originating from the different hyperfine levels of the ground state of the atom.

16. The method as defined in claim 9, including the step of, abruptly truncating the radiation of the sample with said isotope in an excited state for trapping the isotope in the excited state.

17. A method for selective isotope separation, the isotope comprising an atom or molecule comprising:

(a) first, irradiating the atom or molecule at a frequency, the intensity of the radiation slowly increasing in a rise time from zero to a sufficiently high value to produce an adiabatic population inversion of the desired isotope in an excited state when the frequency is tuned near a single narrow resonance associated with the atom or molecule, the single narrow resonance including the overlapping multiphoton resonances originating from either the rotational energy levels of the vibrational ground state of the molecule, or the different hyperfine levels of the ground state of the atom and an excited state, said rise time being greater than $t_m$, where $t_m$ equals:

$$t_M = \max_{E_o \leq E_{max}}\left\{\max_e \frac{|\langle\lambda_o(E_o)|\Delta|\lambda_c(E_o)\rangle|}{[w_{oc}(E_o)]^2}\right\}$$

where $|\lambda_o(E_o)\rangle$ is the dressed state that evolves continuously from the ground state of the atom or molecule as the amplitude of the irradiation field is increased adiabatically from zero to $E_o$, $|\lambda_c(E_o)\rangle$ is the dressed state that evolves continuously from an excited state, $\hbar w_{oc}(E_o)$ is the difference of energy between $|\lambda_o(E_o)\rangle$ and $|\lambda_c(E_o)\rangle$ at the irradiating field amplitude $E_o$, $\Delta$ is a diagonal matrix, the diagonal elements of which in the basis of atomic or molecular energy eigenstates in zero radiation field are $\Delta_{mm} = N(m)w - E_m/\hbar$ where $$N(m) = \text{integer part}\left\{\frac{E_m}{\hbar w}\right\}$$

w being the radiation frequency and $E_m$ being the energy of the atomic or molecular eigenstate in zero radiation field, and $E_{max}$ is the radiation field amplitude at the instant when the pulse achieves its maximum intensity; and (b) second, irradiating the isotope while in said excited state at a wavelength and intensity sufficient to cause transitions out of the previously excited state.

18. The method as defined in claim 17 wherein the certain pulse shape of the initial radiation has a fall time greater than $t_m$ for any of the atomic or molecular species.

19. The method as defined in claim 17, including the step of, abruptly truncating the irradiation of the isotope with the population inversion of the isotope substantially in the excited state.

20. An apparatus for producing a preselected isotope species from a sample material of atoms or molecules comprising:
(a) means for first irradiation of the sample,
(b) means for slowly increasing the intensity of the first irradiation from zero to a sufficiently high value in a particular rise time to produce an adiabatic population inversion of the preselected isotope species in an excited state when the frequency of the sample irradiation means is tuned near a single narrow resonance associated with the atom or molecule of the isotope the single narrow resonance including the overlapping multiphoton resonances originating from either the rotational energy levels of the vibrational ground state or excited states of the molecules, or the different hyperfine levels of the ground state or excited states of the atoms, said particular rise time being greater than $t_m$, where $t_m$ equals:

$$t_M = \max_{E_o \leq E_{max}} \left\{ \max_e \frac{|<\lambda_o(E_o)|\Delta|\lambda_e(E_o)>|}{[w_{oe}(E_o)]^2} \right\}$$

where $|\lambda_o(E_o)>$ is the dressed state that evolves continuously from the ground state of the atom or molecule as the amplitude of the irradiation field is increased adiabatically from zero to $E_o$, $|\lambda_e(E_o)>$ is the dressed state that evolves continuously from an excited state, $\hbar w_{oe}(E_o)$ is the difference of energy between $|\lambda_o(E_o)>$ and $|\lambda_e(E_o)>$ at the irradiating field amplitude $E_o$, $\Delta$ is a diagonal matrix, the diagonal elements of which in the basis of atomic or molecular energy eigenstates in zero radiation field are $\Delta_{mm} = N(m)w - E_m/\hbar$ where $$N(m) = \text{integer part} \left( \frac{E_m}{\hbar w} \right)$$

w being the radiation frequency and $E_m$ being the energy of the atomic or molecular eigenstate in zero radiation field, and $E_{max}$ is the radiation field amplitude at the instant when the pulse achieves its maximum intensity;
(c) means for second irradiation of the isotope species in the excited state, and
(d) means for controlling the second irradiation to produce a wavelength and intensity sufficient to cause transitions of the isotope out of the previously excited state.

21. The apparatus as defined in claim 20 wherein the first irradiation means and the second irradiation means are infrared lasers.

22. The apparatus as defined in claim 20 wherein the first irradiation means and the second irradiation means are ultraviolet lasers.

23. The apparatus as defined in claim 20, wherein the first irradiation means and the second irradiation means operate in the visible portion of the spectrum.

24. The apparatus of claim 20, including means for abruptly truncating the first sample irradiation means.

25. The apparatus of claim 20, wherein the first irradiation means and second irradiation means are lasers.

26. In a method of laser isotope separation where a sample material containing a preselected isotope species in atomic or molecular form is irradiated, the improvement comprising:

irradiating the sample material utilizing a narrow multiphoton spectral line composed of overlapping multiphoto resonances to produce an adiabatic population inversion of the preselected isotope species, the pulse shape of the irradiation having a particular rise time greater than $t_m$, where $t_m$ equals:

$$t_M = \max_{E_o \leq E_{max}} \left\{ \max_e \frac{|<\lambda_o(E_o)|\Delta|\lambda_e(E_o)>|}{[w_{oe}(E_o)]^2} \right\}$$

where $|\lambda_o(E_o)>$ is the dressed state that evolves continuously from the ground state of the atom or molecule as the amplitude of the irradiation field is increased adiabatically from zero to $E_o$, $|\lambda_e(E_o)>$ is the dressed state that evolves continuously from an excited state, $\hbar w_{oe}(E_o)$ is the difference of energy between $|\lambda_o(E_o)>$ and $|\lambda_c(E_o)\rangle$ at the irradiating field amplitude $E_o$, $\Delta$ is a diagonal matrix, the diagonal elements of which in the basis of atomic or molecular energy eigenstates in zero radiation field are $\Delta_{mm} = N(m)w - E_m/\hbar$ where $$N(m) = \text{integer part}\left\{\frac{E_m}{\hbar w}\right\}$$

w being the radiation frequency and $E_m$ being the energy of the atomic or molecular eigenstate in zero radiation field, and $E_{max}$ is the radiation field amplitude at the instant when the pulse achieves its maximum intensity.

27. The method of claim 26, wherein the preselected isotope species substantially exists in the ground state before irradiation.

28. The method of claim 27, wherein the adiabatic population inversion occurs with the majority of the molecules or atoms of the preselected isotope species existing in a particular excited state.

29. The method of claim 26, comprising the further step of, irradiating said species while in the excited state to further excite said species.

30. The method of claim 29, wherein said species comprises polyatomic molecules, the further excitation causing the molecules to dissociate.

31. The method of claim 29, wherein said species comprises atoms, the further excitation causing the atoms to ionize.

* * * * *